(No Model.)
M. MARTIN.
CIRCUIT OF ELECTRIC SIGNALING.
No. 494,279. Patented Mar. 28, 1893.
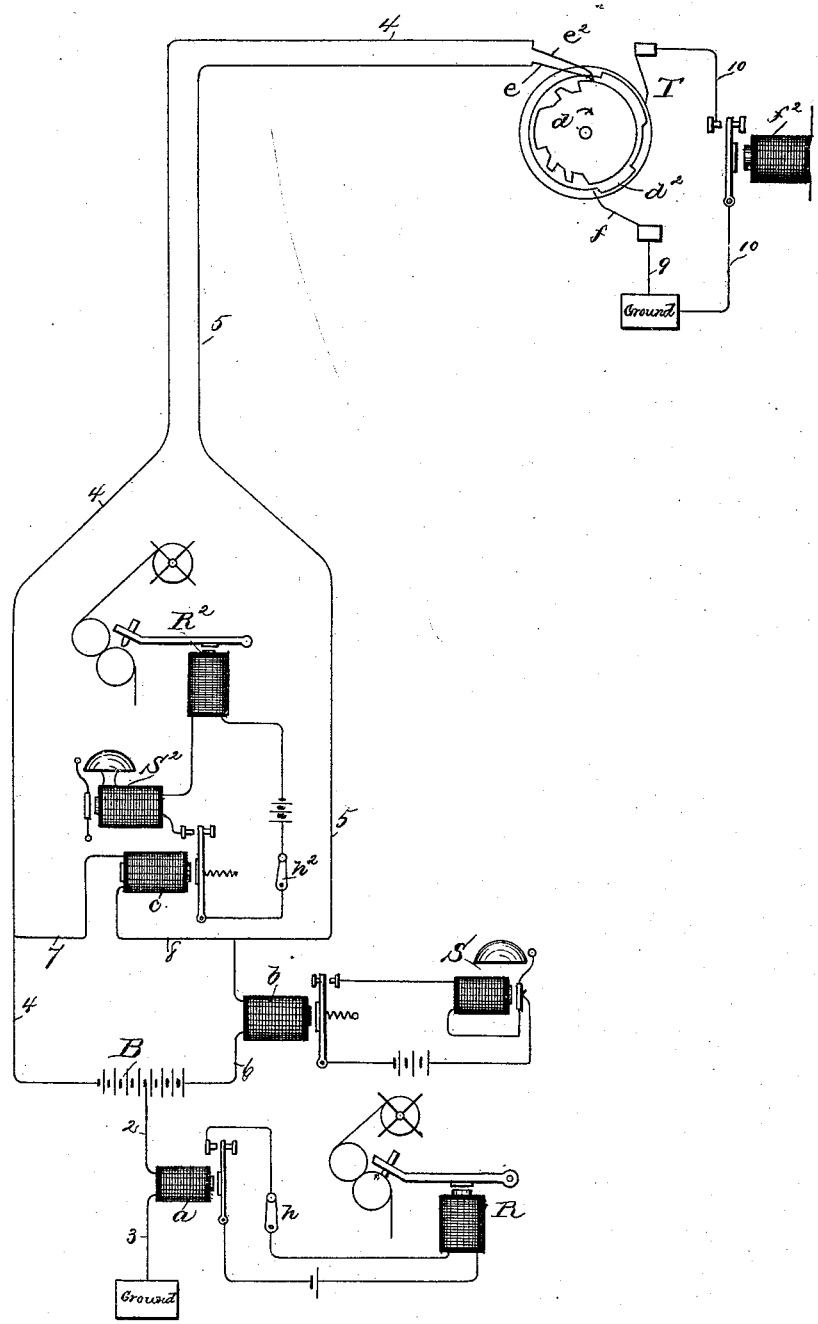
Witnesses.
Jas. J. Maloney.
M. E. Hill
Inventor.
Morris Martin,
by Jos. P. Livermore
Atty.

UNITED STATES PATENT OFFICE.

MORRIS MARTIN, OF MALDEN, MASSACHUSETTS, ASSIGNOR, BY DIRECT AND MESNE ASSIGNMENTS, TO THE UNITED STATES ELECTRIC FIRE SIGNAL COMPANY, OF MAINE.

CIRCUIT OF ELECTRIC SIGNALING.

SPECIFICATION forming part of Letters Patent No. 494,279, dated March 28, 1893.

Application filed July 14, 1890. Serial No. 358,682. (No model.)

*To all whom it may concern:*

Be it known that I, MORRIS MARTIN, of Malden, county of Middlesex, State of Massachusetts, have invented an Improvement in Circuits for Electric Signaling, of which the following description, in connection with the accompanying drawing, is a specification, like letters and figures on the drawing representing like parts.

My invention relates to a circuit for electric signaling of that kind in which the telegraphic messages are transmitted over a metallic circuit, or a ground circuit, or both, so as to insure the reception of the signal if the circuit has become deranged.

The invention consists mainly in a novel arrangement of the receiving and transmitting instruments with relation to the circuit and battery therein, the apparatus comprising a battery located at the receiving station having an intermediate point connected through a receiving instrument with the ground, and having its terminals connected with a metallic line extending out to the transmitting stations and being connected with the transmitting instruments which normally retain the said metallic line closed and alternately break and close the same when they are operating to transmit signals or messages. Another receiving instrument is provided having its terminals connected with the terminals of the battery, the circuit of which thus comprises two branches one of which includes the said receiving instrument and the other of which constitutes the main metallic line extending out to the transmitting stations. The said main line thus constitutes a shunt or short circuit around the receiving instrument contained in the other branch of the main battery circuit, and the resistance of the two branches is so proportioned that while the main line or external circuit is closed the portion of the current that passes through the receiving instrument in the other branch is insufficient to operate it, but if the main line is broken the entire current is thrown into the receiving instrument in the other branch and causes the same to be operated. The external transmitter is properly constructed to open and close the metallic line and also to connect the metallic line with the ground when the said metallic line is closed in the act of transmitting the signal. The result of this is, that the receiving instrument that is included in a branch of the metallic line responds to the breaks in the metallic circuit while the receiving instrument which is included in the ground branch from the intermediate point in the main battery responds to the closures and grounding of the metallic circuit and is under control of either part of the metallic circuit extending from the transmitting to the receiving station. If the metallic circuit is intact both instruments at the receiving station will respond to the transmitting instrument, and if the metallic circuit is broken or if the two portions of the said metallic circuit extending from the opposite sides of the transmitting instrument to the receiving station are connected by a cross connection the receiving instrument in the ground branch will still respond to the transmitting instrument, and consequently if either portion of the main circuit extending from the one or the other side of the transmitting instrument to the receiving station is in working condition the message will be received, and this result is attained without using opposing batteries and without requiring any operation of switches at the receiving station, when the line has become deranged.

If desired signals can be transmitted by connecting the main external circuit with the ground, and opening and closing said ground connection which signals will be received only upon the receiving instrument that is in the ground branch at the receiving station.

The drawing shows in diagram a circuit and signal receiving and transmitting instruments embodying this invention.

The apparatus is operated by a main battery B at the receiving station, having an intermediate plate connected by a suitable conductor 2, 3, with the ground, the said conductor containing a receiving instrument shown as a relay $a$ the armature of which controls a local circuit containing a signaling instrument R of any suitable character, as for example a Morse register for recording messages on a traveling strip of paper. One terminal of the battery B is connected with the main line 4, extending to the transmitting stations of which there may be any desired number on said line, said main line being continued through the said stations as shown at 5, 6, and connected with the other terminal of said battery B so that the said conductors 4, 5, 6, constitute a normally closed metallic circuit for said battery. The said battery circuit preferably includes the coils of an electro magnet $b$ the armature of which controls a local circuit containing an alarm or indicating instrument S the said local circuit being closed upon the retraction of said armature and throwing the said instrument S into operation. The retractor of said armature is intended to be adjusted to retract the armature when the current strength of the battery B falls below the amount required for the efficient operation of the apparatus and thus call attention to the weakening of the battery so that the proper replenishment may be made. The conductors 4, 6 leading from opposite poles of battery B are connected by a branch 7, 8, including the coils of the electro magnet $c$ of a relay, the armature of which controls a local circuit including a receiving instrument $R^2$, which may be an ordinary Morse register like the instrument R. The said local circuit controlled by the relay magnet $c$ may also include a signal or indicating instrument $S^2$ to call attention to the operation of the relay $c$ and instrument $R^2$. By this arrangement of the circuits it will be seen that the conductors 4, 5, 6, and 4, 7, 8, 6, constitute two branch circuits for the main battery B both of which are normally closed so that the current of the battery B divides between the two, and the resistance of the said branches and the relay magnet $c$ in the branch 7, 8, are so proportioned and adjusted that when both said branches are closed the portion of the current that passes through the branch 7, 8, and the relay magnet $c$ is insufficient to energize the said magnet which thus normally stands with its armature retracted, the local circuit of said magnet being preferably connected with the armature and its front stop and thus standing normally open. It will also be understood that when the conductors 4, 5, 6, 7, 8, are all disconnected from the ground there will be no current in the ground branch 2, 3, and consequently under these conditions, which are the normal conditions of the apparatus, the relay magnet $a$ will not be energized, its armature will be retracted, and the local circuit controlled by said relay if connected with the armature and front stop as shown, will be open.

The transmitting instrument indicated at T is shown in this instance as intended for producing a definite series of breaks and closures, in the circuit, being of the kind commonly employed in fire alarm and district telegraphy and for convenience referred to as a break-wheel, it being understood that the said break-wheel is caused to rotate with a properly governed movement when the signal or message is to be transmitted by it. The said break-wheel comprises a conducting portion, wheel, or disk $d$, against which springs $e$, $e^2$, forming the terminals of the portions 4, 5, of the main metallic line connecting the transmitting and receiving stations normally rest so as to close the said line. The said disk is provided with notches or insulating portions which in the rotation of the said disk pass the springs $e$, $e^2$, and thus cause them to become disconnected, or in other words to open the circuit 4, 5, under which condition the entire current of the battery B is caused to pass through the relay magnet $c$, and is sufficient to energize the said magnet and cause it to attract its armature so that the local circuit controlled by the said relay magnet $c$ and the receiving instrument $R^2$ therein responds to the breaks in the metallic circuit 4, 5, produced by the notches of the wheel $d$ passing the ends of the contact springs $e$, $e^2$. If, however, either portion 4 or 5 of the main circuit should be broken externally to the transmitting instrument the current of the battery B would pass through the relay magnet $c$ all the time and the latter would not be affected by the break wheel $d$ so that if the said line should be broken at either side of the transmitting instrument no signal or message would be received upon the instrument $R^2$, and if there should be a cross connection between the wires 4 and 5, the opening or separation of said wires at the transmitting instrument would not completely open the said circuit and consequently would not cause the entire current of the battery B to pass through the relay magnet $c$ and consequently under this condition the receiving instrument $R^2$ would not respond to the transmitting instrument T.

In order to insure the reception of the signal when the main line 4, 5, is deranged either by breakage of one of its portions 4 or 5, or by a cross connection between them the break wheel $d$ has connected with it and practically constituting a portion of it, a ground contact portion $d^2$, co-operating with a contact spring $f$, connected with the ground by wire 9, the said contact portion $d^2$ being so constructed and adjusted that when the break-wheel is stopped in normal position it is disconnected from the spring $f$ but when the break wheel begins to move, contact is made between $d^2$ and $f$, before the contact is broken between the wheel $d$ and the springs $e$, $e^2$. The contact portion $d^2$ is so arranged with relation to the notches in the wheel $d$ that in the simultaneous rotation of the wheels $d$, $d^2$, which are in fact a single moving portion of the transmitter, the contact will be broken between the portion $d^2$ and the spring $f$ at the time when the springs $e$, $e^2$, are on an extended or practically continuous portion of the surface of the wheel $d$. In other words, the contacting portions of the wheel $d$ are such as to make connection with the spring $f$ while the notches of the wheel $d$ are passing the springs $e$, $e^2$. Thus the normal operation of the instrument is as follows:—When the wheels $d$, $d^2$, begin to rotate, $d^2$ makes contact with $f$, while $e$, $e^2$, still remain in contact with $d$ and thus with $d^2$ and $f$, as $d$ and $d^2$ constitute portions of one and the same metallic piece or conductor. Thus a ground circuit is afforded from the ground wire 9 over both branches 4 and 5, of the main circuit through the two sections of the battery and the ground wire 2, 3, which circuit includes the relay magnet $a$, which is thus energized causing the receiving instrument R to respond no effect being produced as yet upon the receiving instrument $R^2$. Then in the further operation of the wheels $d$, $d^2$, a notch of the former comes between the springs $e$, $e^2$, thus wholly disconnecting them from the said wheels $d$, $d^2$, and from one another, and thus opening the ground circuit and demagnetizing the relay magnet $a$ in the ground branch but at the same time causing the entire current of the battery B to pass to the relay magnet $c$ which is then energized and causes the instrument $R^2$ to respond. Then when the notch of the wheel $d$ has passed the springs $e$, $e^2$, the latter are again connected together, and with the spring $f$ which causes a second impulse in the receiving instrument R which is shortly after interrupted by the next notch of the wheel $d$ which causes a second impulse in the receiving instrument $R^2$; and consequently in the rotations of the wheels $d$, $d^2$, a series of impulses or signals are produced in the instruments R, $R^2$, those in the former corresponding to the teeth or conducting portions of the wheel $d$, while those in the latter correspond to the notches or non conducting portions of the said wheel, The surface of the wheel $d^2$ is cut away in parts corresponding to the conducting portions of the wheel $d$ which represent interruptions between the closed impulses of the receiving instrument so that the same message or class of signals is received on both instruments R and $R^2$ the former being produced by closures of the main line 4, 5, to the ground, while the latter are produced by breaks in the main line 4, 5. It will be seen that for, the ground circuit both portions 4, 5, of the main circuit constitute practically a single line so that a cross connection between them will not interfere with the transmission of the messages on said ground circuit, so, that said messages will be received upon the instruments R even if such a cross connection should prevent the reception of messages on the instrument $R^2$ and also that either portion 4 or 5, constitutes a ground circuit including a portion of the battery which is sufficient to operate the receiving relay $a$, so that if either of said portions should be broken the message would be still received over the ground circuit including the other portion by the relay $a$. If either portion 4 or 5 of the main circuit should become permanently grounded the relay $a$ would remain energized and would be unaffected by the transmitting instrument but the relay $c$ would still respond to the breaking and closing of the main line 4, 5, at either side of the ground connection so that under all of the usual derangements that can occur to the circuit the message of the transmitting instrument will be received by one or the other of the relays $a$, $c$, this result being attained without the use of opposing batteries, which is objectionable; and also without requiring any manual operation or change of circuit at the receiving station when the derangement occurred.

The circuit may be employed to receive other messages than those produced by the teeth and notches of the break wheel $d$, which, as already described, in connection with the corresponding portion of the wheel $d^2$, cause both relays $a$ and $c$ to operate. For example, a ground branch can be connected temporarily with the said circuit and breaks and closures produced in said ground branch, by any usual means as by a break wheel or key that will operate the relay $a$ without affecting the relay $c$. In some cases it is desirable to transmit such additional messages which result is effected as follows;—After the notches of the wheel $d$ have passed the springs $e$, $e^2$, and the corresponding conducting portions of the wheel $d^2$ have passed the spring $f$, a series of closures and brakes may be produced in a normally open ground branch through spring T and wire 10 shown in this instance as controlled by the armature of an electro magnet $f$ so as to produce an additional message which is received on the instrument R only the instrument $R^2$ not responding as the main line 4, 5, is at this time kept closed.

In another application, Serial No. 358,683, filed July 14, 1890, I have shown and described a transmitting instrument adapted to operate in a circuit of the kind herein described, for automatic transmission of fire alarms, in which portions corresponding to the break wheel transmit a signal indicating the general location of a fire, as for example the number of a building or a group of buildings provided with transmitting mechanism, which signal is normally received on both instruments R and $R^2$, or is received on one or the other of said instruments under various derangements of the main transmitting circuit, as described, while a relay corresponding to the electro magnet $f^2$ transmits a signal which is received only on the instrument R which indicates more minutely the location of the fire as for example, giving the floor of a building or the particular building of a group of buildings, which group is characterized by the signal of the break wheel; but the present invention is not limited to any specific construction of the transmitting and receiving apparatus, nor to any special kind of signaling. The local circuits controlled by the relays $a$ and $c$ are preferably provided with switches $h$, $h^2$, which may be opened in case the corresponding relays become energized by derangement of the circuit such for example, as grounding, which would cause the relay *a* to remain energized, or a breakage which would cause the relay *c* to remain energized.

I claim—

1. A circuit for electric transmission comprising a main metallic line connecting the receiving and transmitting stations and having a battery included therein, a receiving instrument in a branch of said main line and normally shunted thereby while the said main line is closed and intact; a ground branch and receiving instrument therein at the receiving station connected with an intermediate portion of said battery and a transmitting instrument comprising a break wheel or movable signaling surface and contacts co-operating therewith connected with the portions of the main line extending to the opposite terminals of the main battery and with the ground; and a normally open ground branch as 10, and transmitting instrument therein by which messages may be sent to the receiving instrument in the ground branch at the receiving station independent of those sent by the break wheel, substantially as described.

2. A circuit for electric transmission comprising a main metallic line connecting the receiving and transmitting stations and having a battery included therein; a receiving instrument in a branch of said main line, and normally shunted thereby while said main line is closed and intact; and a ground branch and receiving instrument therein at the receiving station, connected with an intermediate portion of said battery, and a transmitting instrument comprising a break wheel or a movable signaling surface, and contacts co-operating therewith connected with the portions of the main line extending to the opposite terminals of the main battery and a contact connected with the ground, substantially as described.

In testimony whereof I have signed my name to this specification in the presence of two subscribing witnesses.

MORRIS MARTIN.

Witnesses:
JOS. P. LIVERMORE,
JAS. J. MALONEY.